United States Patent [19]
Margetts et al.

[11] 3,820,833
[45] June 28, 1974

[54] LATERALLY EXTENSIBLE BUMPER FOR A CAMPER BODY

[76] Inventors: John L. Margetts, 2182 Berkely; George Philip Margetts, 3196 Mill Creek Rd., both of Salt Lake City, Utah 84109

[22] Filed: Apr. 26, 1971

[21] Appl. No.: 137,623

Related U.S. Application Data

[62] Division of Ser. No. 809,252, March 21, 1969, Pat. No. 3,601,271.

[52] U.S. Cl. ............ 293/63, 280/164 R, 293/69 R, 293/73, 293/77, 296/23 MC
[51] Int. Cl. ........ B60p 3/32, B60r 3/00, B60r 19/04
[58] Field of Search ............... 293/63, 69 R, 73, 77; 296/23 MC; 280/164 R, 163

[56] References Cited
UNITED STATES PATENTS

| | | | |
|---|---|---|---|
| 845,100 | 2/1907 | Kohout | 214/75 R |
| 1,325,733 | 12/1919 | Lyon | 293/77 |
| 1,386,186 | 8/1921 | Lyon | 293/77 |
| 1,386,191 | 8/1921 | Lyon | 293/77 |
| 1,387,163 | 8/1921 | Munzlinger | 214/517 |
| 1,396,628 | 11/1921 | Ellis | 293/77 X |
| 1,567,478 | 12/1925 | Vonnez et al. | 214/517 |
| 1,794,532 | 3/1931 | Nenna | 293/69 R |
| 2,213,840 | 9/1940 | Hoecker | 203/69 R |
| 2,537,707 | 1/1951 | Russ et al. | 280/164 R X |
| 2,621,956 | 12/1952 | Brown | 293/69 R |
| 2,789,854 | 4/1957 | Hope | 293/73 X |
| 3,197,054 | 12/1965 | Settem | 214/517 |
| 3,221,913 | 12/1965 | Chamberlain | 214/517 |
| 3,229,839 | 1/1966 | Rasmussen | 214/517 |
| 3,409,154 | 11/1968 | Rasmussen | 214/515 |
| 3,409,272 | 11/1968 | Rasmussen | 254/45 |
| 3,447,826 | 6/1969 | Gostomski | 293/73 X |
| 3,488,077 | 1/1970 | Miller | 293/73 |
| 3,547,480 | 12/1970 | Ward | 296/23 MC |
| 3,601,271 | 8/1971 | Margetts et al. | 214/516 |

*Primary Examiner*—Lloyd L. King
*Assistant Examiner*—Howard Beltran

[57] ABSTRACT

A camper loading system wherein a single drive gear mounted on a truck bed is adapted to drive a pair of driven gears and their associated load gears or one of the driven gears and its load gear individually, to thereby drive the load gear or load gears in meshing engagement with racks on the bottom of a camper body; extensible front legs, pivoted on a support shaft fixed to a weight distributing mounting plate on the side wall of a camper body, are movable between a camper supporting position and a stowed position; wheel carrying rear legs are attachable to either the camper body or to an adjustable bumper secured to the camper body and are movable between an extended support position beneath the camper body and an easily accessible stowed position; and an easily released lock is provided to automatically secure the camper body against sliding off of the truck bed after it has been loaded thereon.

3 Claims, 15 Drawing Figures

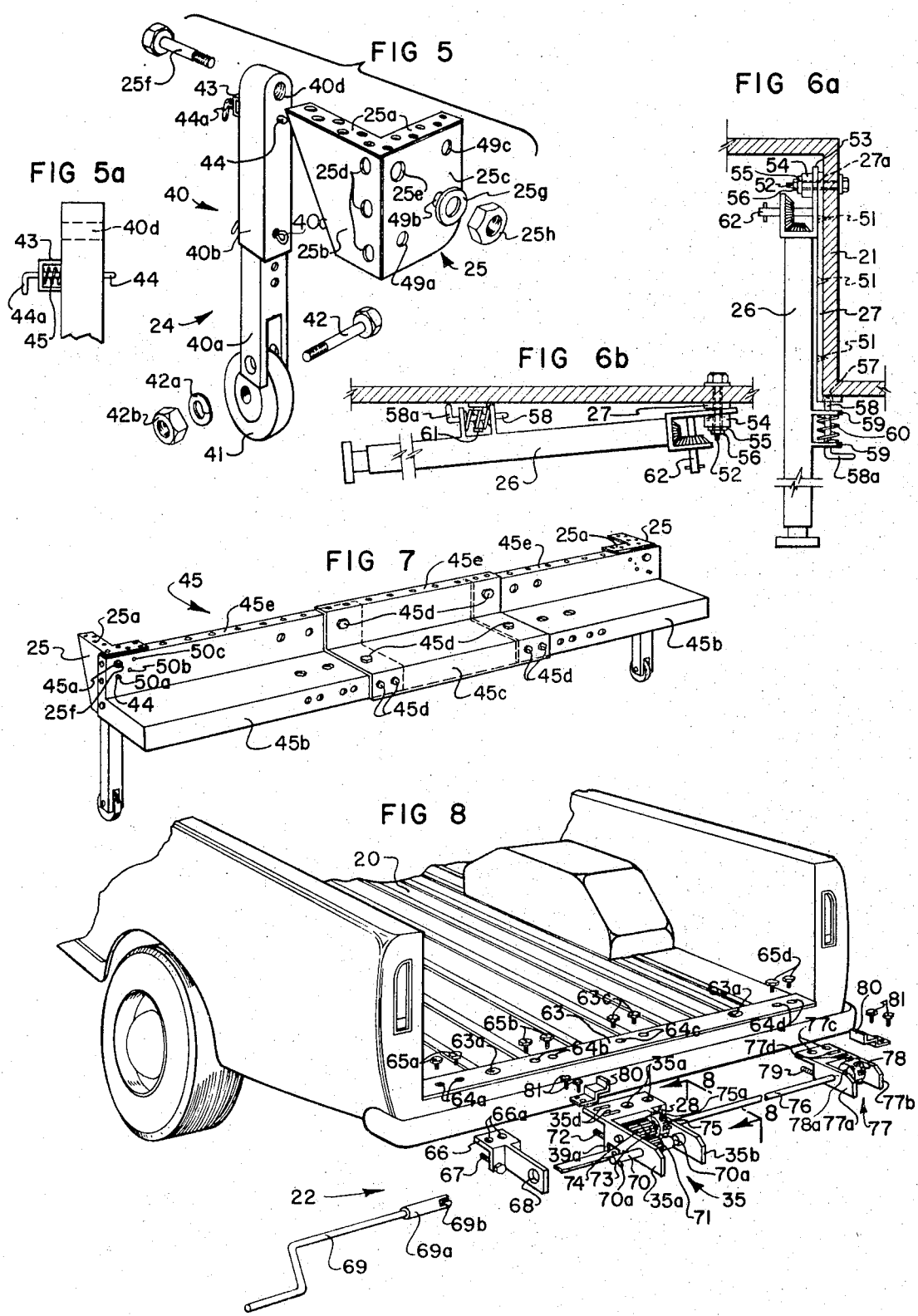

LATERALLY EXTENSIBLE BUMPER FOR A CAMPER BODY

This application is a division of application Ser. No. 809,252, filed Mar. 21, 1969 now U.S. Pat. No. 3,601,271.

BACKGROUND OF THE INVENTION

1. Field of the Invention

This invention relates to camper loaders and particularly to loaders that raise a camper body and pull it onto a truck bed or that push it from a truck bed and support it, as distinguished from systems wherein the camper body is raised and a truck bed is thereafter moved therebeneath or away therefrom.

2. Prior Art

It has long been known that movable bodies can be dragged onto a truck bed or can be pushed therefrom. Many early patents show such systems. U.S. Pat. Nos. 845,100 and 1,567,478, for example, show systems wherein cables are used to pull bodies onto a truck bed and gears and racks are used to push them off. U.S. Pat. No. 1,387,163 shows a system wherein a single shaft is used to support gears and pulleys so that manual turning of the single shaft will wind or unwind cables secured to a movable body as the movable body is moved to or from a truck bed and also drive the gears to mesh with racks on the bottom of the movable body to move it onto or off of a truck bed.

With the increased popularity of truck and camper body combinations there has been a renewed interest in systems that will load and unload the camper bodies with respect to truck beds.

The early camper loader systems have involved the use of two or more jacks to raise the camper body until a truck bed can be moved thereunder or from therebeneath, depending upon whether a loading operation or an unloading operation was taking place. These systems have generally required more than one operator and can be very dangerous if the truck is not carefully driven or if the camper body is not properly balanced on the jacks.

More recently, there have been many patents granted covering loader systems wherein the camper body is raised and dragged onto a truck bed or is pushed off. U.S. Pat. Nos. 3,197,054, 3,221,913, 3,229,839, 3,409,154 and 3,409,272, for example, show such systems.

SUMMARY OF THE INVENTION

To the best of our knowledge there has not heretofore been an economical system wherein the camper body is automatically locked in place on the truck bed or wherein the wheeled, rear support legs can be attached beneath the camper body or to an adjustable bumper that is secured to the bottom of the camper body and be moved from a depending support position to a raised, stowed position where the leg is conveniently accessible. Also, to the best of our knowledge there has not been a system wherein telescoping front legs movable between a raised stowed position and a lowered support position can be easily positioned on a camper body such that they will positively support a camper body, without danger of the camper body dropping onto a support member of the leg and damaging it.

Objects of the present invention are to provide a camper loader system having means for automatically locking a camper body against inadvertantly sliding off a truck bed, rear legs that can be used with or without an adjustable bumper, telescoping front legs that can be easily positioned on most conventional slide-in type camper bodies and that will provide positive safe support to the camper body but that can still be easily stowed when the camper body is moved onto a truck bed, and a drive unit that can be economically constructed for either a single or a double rack unit.

Principal features of the invention include a spring biased, lever released pin and cooperating recess on the truck bed and camper body to serve as a lock; wheel carrying rear legs, pivotally connected to a mounting bracket that is adaptable to fit either on the bottom of a camper body or as an integral part of an adjustable bumper and that has a spring biased pin engageable with a plurality of holes in the bracket so that the stowed position of the legs can be chosen, as desired; and telescoping front legs that are secured through weight distributing mounting plates to support a camper body. Upper pivot mountings of the front legs are provided with resilient pads so that the legs will have sufficient lateral swinging movement to insure their proper securement when they are extending downwardly to support the camper and clearance as they are pivoted to a stowed position past the side wall of the camper body.

Additional objects and features will become apparent from the following detailed description and drawings, disclosing what is presently contemplated as being the best mode of the invention.

THE DRAWINGS

FIG. 1 is a side elevation view of a truck and camper body, equipped with all of the loading system of the invention, except the adjustable bumper;

FIG. 2, a rear elevation view;

FIG. 3, a fragmentary side elevation view of the camper body of FIGS. 1 and 2, supported by front and rear legs and with the stowed position of a front leg shown in dotted lines;

FIG. 3a, an enlarged, fragmentary section, taken on the line 3a—3a of FIG. 3;

FIG. 4, a fragmentary front elevation view of the camper body of FIG. 3;

FIG. 5, an exploded perspective view of the rear leg and bracket therefor;

FIG. 5a, an enlarged side elevation view of the upper portion of the leg of FIG. 5;

FIG. 6a, an enlarged view, taken on the line 6a—6a of FIG. 3;

FIG. 6b, a similar view taken on the line 6b—6b of FIG. 3;

FIG. 7, an enlarged perspective view of the rear legs and brackets therefor, forming an integral part of an adjustable bumper;

FIG. 8, a fragmentary, exploded perspective view of the rear of a truck bed and the drive mechanism of the unit arranged to drive one or both of a pair of rack engaging load gears;

FIG. 9, an enlarged view taken on the line 9—9 of FIG. 8 showing the lock pin, and with the camper body also shown fragmentarily;

FIG. 10, an enlarged, exploded perspective view of the drive mechanism arranged to drive a single, central, rack engaging load gear;

FIG. 11, a bottom view of the camper body of FIGS. 1 and 2; and

FIG. 11a, a fragmentary side elevation view of the camper body, taken on the line 11a—11a of FIG. 11, and inverted to show the normal position of the recess for the lock pin.

DETAILED DESCRIPTION

Figure 1:
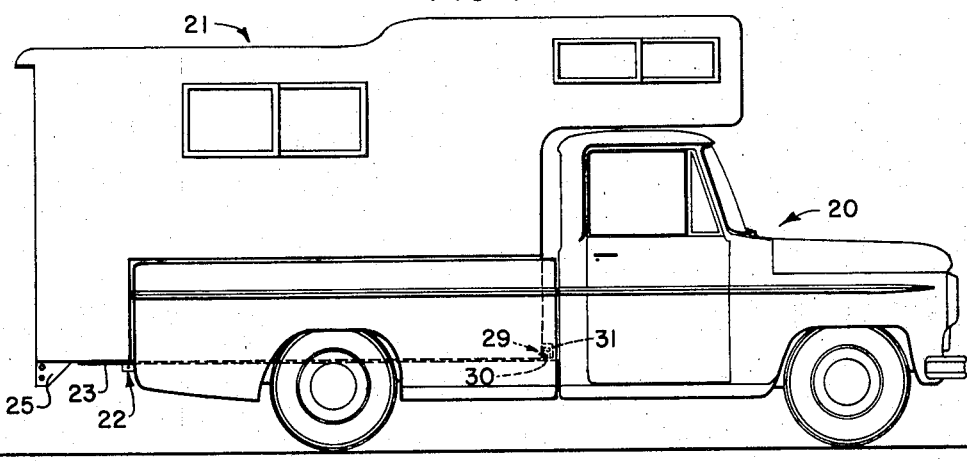

Referring now to the drawings:

In the illustrated preferred embodiment, the camper loader of the invention is shown in FIGS. 1–4 and 11 and 11a as being mounted on a pickup truck 20 and a camper body 21.

The camper loader includes a drive means, shown generally at 22, removably connected to the rear end of the truck bed; one or more racks 23, fixed to the bottom of the camper body and extending beyond the length of the camper body that is adapted to rest on the truck bed; wheel carrying rear legs 24 and their support brackets 25; telescoping front legs 26 and their mounting brackets 27, FIG. 6; and a lock 28 (FIGS. 8–10) adapted to automatically secure the camper body against its sliding from the truck bed. Hold down devices shown generally at 29, FIG. 1, cooperate to hold the camper body against its bouncing off the truck bed. While only one of front legs 27 is shown, it is to be understood that two will normally be provided, with one at each side of the camper body.

The hold down devices 29 are conventional and include rollers 30 fixed to the front of the camper body to allow it to more easily move onto and off of the truck bed, and angle members 31, fixed to the truck bed and arranged such that rollers 30 will move thereunder. These hold down devices securely anchor the camper body against its bouncing off the truck bed and, when used in combination with the lock 28 hold the camper body against any undesired movement off of the truck bed.

Figure 9:
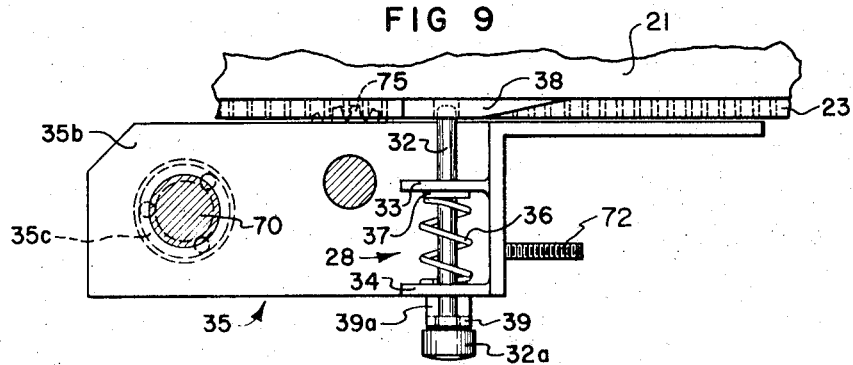
Figure 10:
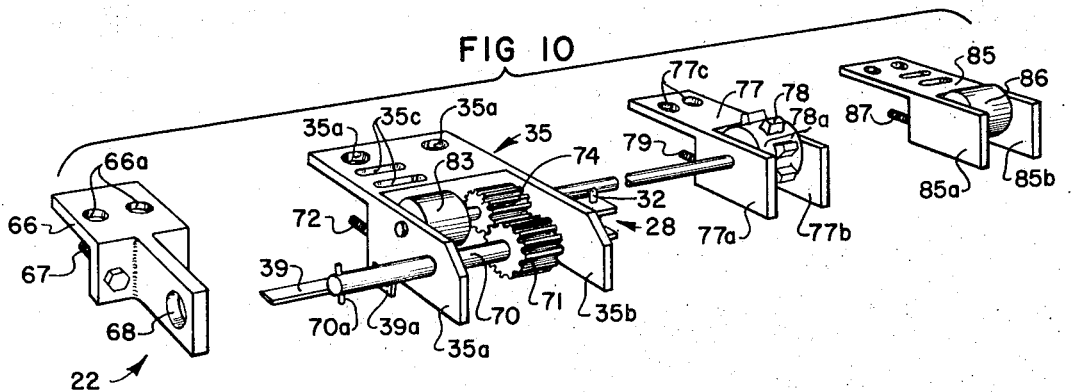
Figure 11:
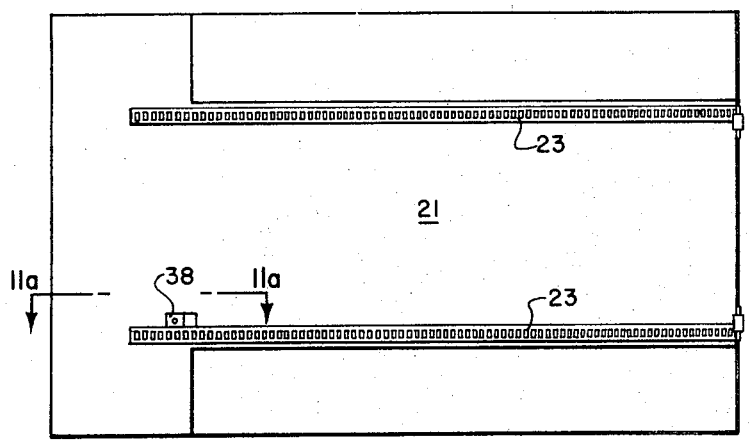
Figure 11A:
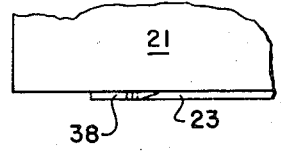

Lock 28, FIGS. 8–10, comprises a pin 32 that extends upwardly through a pair of ears 33 and 34 on a support 35 of the drive means 22. A spring 36, resting on lower ear 34 and acting against a member 37, fixed to pin 32, biases the pin upwardly so that it will engage a plate 38 fixed to the underside of the camper body 21 and will lock into a hole provided therefor in the plate. When the pin is in the hole, the camper is secured against its sliding out of the truck bed.

A lever 39 has one end loosely connected to the lower end of pin 32, and its free end extending through a depending support bracket 39a fixed to support 35 such that lifting on the free end will pivot the lever against support 35 to pull down on the head 32a of pin 32. When the lever is released spring 36 will again force the pin up.

Rear legs 24 each include a post 40, comprising a member 40a, bifurcated to receive a wheel 41 that is journaled on a bolt 42 passed through the bifurcated portions and secured in place by washer 42a and nut 42b and a member 40b into which member 40a telescopes. A cotter pin 40c, passed through a hole in member 40a and one of the holes in member 40c locks the members together to form a post 40 of desired length. Each leg has a bracket 43 thereon and a pin 44 is inserted through the bracket and is spring biased by a spring 45, one end of which acts on the bracket and the other end of which acts against a shoulder 46 of the pin. Pin 44 is bent at one end 44a to provide a handle, whereby the pin can be easily grasped to be retracted against the force of the spring.

Figure 2:
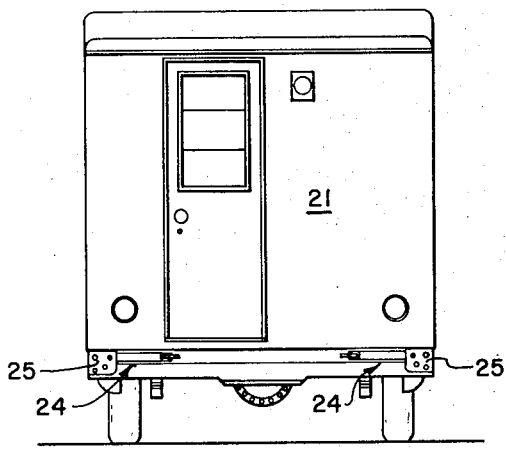
Figure 4:
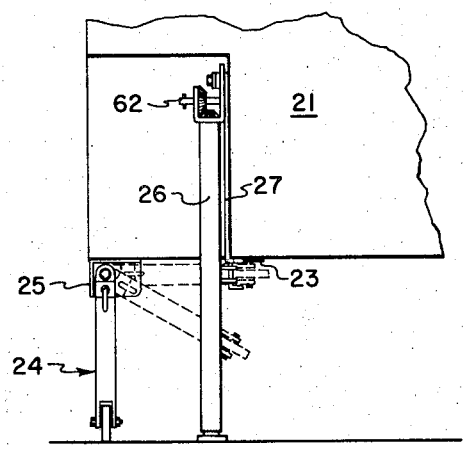
Figure 3:
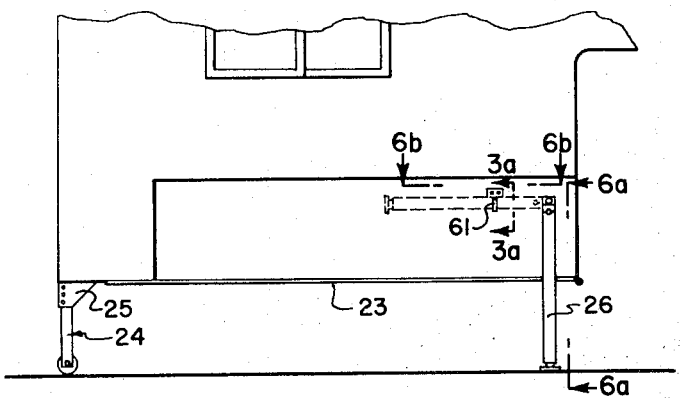

A leg support bracket 25 is provided for each leg 24 and each such bracket forms a corner, with an inturned flange 25a thereabove adapted to be secured by screws to the bottom corner of a camper body as shown in FIGS. 1–3 and with walls 25b and 25c that are adapted to serve as integral parts of an adjustable bumper, shown generally at 45, FIG. 7. Wall 25b has a plurality of holes 25d therethrough to align with corresponding holes in an inturned edge of an outer portion 45a of the bumper so that they can be bolted together. Wall 25c has a hole 25e through which a pivot bolt 25f inserted through a hole 40d in post 40 is passed, and, if the bracket 25 is used as part of a bumper 45, the bolt 25f is also inserted through a hole 45a in the bumper, before a washer 25g and a nut 25h are placed thereon.

Holes 49a, 49b and 49c are radially spaced around hole 25d and corresponding holes 50a, 50b and 50c are spaced around hole 45a so that the pin 44 of the leg 24 attached to a hole 24 will be biased into and through the hole 50a when the leg is locked in its downward extending position. At the same time, if the bumper portion 45b is attached to the bracket 25, the pin will extend through hole 50a. Similarly, when the leg 24 is raised to a stowed position pin 44 will extend into and through one of the holes 49b or 49c and, if the bracket 25 is attached to the bumper portion 45b, through hole 50b or 50c also. In general, the legs 24 will be stowed in their uppermost positions wherein pins 44 extend through holes 49c when the adjustable bumper is not used, and will be stowed in their intermediate positions wherein pins 44 extend into and through holes 49b and 50b when the bumper is used. The legs are thus stowed fully out of the way and are still readily grasped to be lowered when pin 44 is retracted, whether or not the bumper is used.

The adjustable bumper, in addition to the leg support brackets 25, which are bolted to outer bumper portions 45b, includes a central portion 45c that overlaps the outer portions 45b and that is attached therebetween by bolts 45d. A plurality of holes are provided through the outer portions to receive bolts 45d, so the overall length of the composite bumper can be adjusted to fit virtually any slide-in type camper body. Inturned flanges 45e on the outer and central portions of the bumper have holes therethrough and are aligned with the inturned flanges 25a to be secured by screens (not shown) to the rear bottom edge of the camper body.

A bolt 52 extends through the camper body side wall and is threaded through an interiorly threaded hole 27a in the bracket 27. An upstanding flange 53 on the top of leg 24 then fits freely over bolt 52 and a resilient pad 54 is provided between the flange 53 and a washer 55 that is held in place on the bolt 52 by a nut 56.

The inturned portion of mounting bracket 27 has a hole 57 therein, adapted to receive the end of a pin 58 that is supported by mounts 59 on leg 24 and that is biased by spring 60 into the hole 57. The pin 58 is bent at 58a to provide a handle that can be grasped to withdraw the pin from the hole 57. None of the weight of the camper body is transmitted through the pin 58, since it is all transmitted through flange 53 to the leg. Pin 58 merely locks the leg in its support position.

Figure 3A:
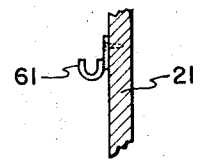

The resilient pad 54 allows the leg to swing out, away from the side wall of the camper as it is pivoted about bolt 52, and a hook 61 (FIG. 3, 3a, and 6b) is fixed to the side wall such that when the leg is pivoted to a stored position alongside of the side wall the hook will engage the pin 52 to hold the leg.

With this arrangement of mounting bracket and leg, it is a simple matter to mount the unit and no precise measurements are required. It is only necessary to place the mounting bracket on the side wall of the camper body so that the inturned edge fits tight against the bottom thereof and to insert screws 51. Thereafter the hole through the side wall for bolt 52 can be drilled and the leg can be secured. Both front legs can be of a conventional jacking-type, such as is illustrated, with the operating mechanism turned through shaft 62 using a crank, which may be the same crank used with the drive means 22. Alternatively, one front leg can be of jacking-type and the other can merely be extensible. Both types of legs are well known in the art and will not be disclosed further here. It is only necessary that they each have an upstanding flange 53 through which the weight of the camper body can be transmitted and by which they can be attached to the camper body.

The drive means 22 for moving the camper body onto and off of the truck bed is constructed such that the components thereof can be readily used in conjunction with either a pair of longitudinally extending racks, spaced one at each side of the bottom of the camper body or with a single, centrally positioned, longitudinally extending rack.

Thus, a support plate 63 is permanently mounted to extend completely across the rear end of the truck bed by bolts 63a. The support plate has tapped sets of holes 64a, 64b, 64c and 64d therein, and the holes are adapted to receive bolts 65a, 65b, 65c and 65d, respectively.

Bolts 64a are adapted to be inserted through holes 66a provided therefor in a bracket 64 to secure the bracket to the rear of the truck bed. An adjustment bolt 67, threaded through the bracket is adapted to engage the rear of the truck bed and can be adjusted to set the position of the bracket. A hole 68, through the bracket is adapted to receive and guide an enlarged tubular end 69a of a crank 69. The adjustment bolt 67 allows for adjustment of the positioning of bracket 64 so that when the crank is inserted it will be in alignment with the shaft 70 of a drive gear 71 carried by the support 35. Support 35 also has holes 35a, through which bolts 65b are inserted to secure the support to the truck bed and one or more adjustment bolts 72 threaded therethrough to engage the rear of the truck bed in the same manner as adjustment bolt 67.

As shown in FIG. 8, shaft 70 and drive gear 71 can reciprocate between plates 35a and 35b of support 35 and a conventional spring ball detent 35c, FIG. 9, is used to engage grooves 70a on shaft 68 to fix the shaft in alternative positions.

In one of its alternative positions drive gear 71 is adapted to mesh with both driven gear 73 and driven gear 74, also mounted between the plates 35a and 35b. In its other alternative position, drive gear 71 meshes only with driven gear 73.

Driven gear 73 has a load gear 75 connected thereto and the sprocket is adapted to mesh with a rack 76 (FIG. 11) on the bottom of the camper body to translate the camper body. Both the driven gear 73 and the load gear 75 are journaled around a shaft 76 that is also journaled through the plates 35a and 35b and through plates 77a and 77b of another spaced support 77.

Driven gear 74 is fixed to shaft 76 and a load gear 78 adapted to mesh with another rack 79 on the bottom of the camper body is fixed to the shaft 76, between the plates 77a and 77b.

Rollers 75a and 78a, which may be formed integral with the load gears 75 and 78, as shown, or which may be separate therefrom engage the rack 23 and support the camper body as it is moved onto and off of and is positioned on the camper body. Thus, the rollers 30 at the front of the camper body and the rollers 75a and 78a on the drive means hold the camper body slightly above the bed of the truck and insure that the only friction encountered at the camper body is moved is roller friction, rather than sliding friction.

Support 77, like bracket 66 and support 35 has holes 77c, through which bolts 62d are adapted to be inserted to secure the support to the truck bed, and at least one adjustment bolt 79 threaded therethrough to allow for adjustment of the support relative to the truck bed.

In use, angled slots 69b in the end 69a of crank 69 engages a transverse pin 70a extending through the end of shaft 70 so that the shaft and the drive gear 71 carried thereby can be longitudinally moved. In one of its alternative positions gear 71 will engage both driven gears to drive both load gears as they mesh with the racks on the bottom of the camper body.

If, however, the drive gear 71 is moved to its other alternative position it is in mesh only with driven gear 73 and only load gear 75 is driven. Thus, if the camper body is not moving straight onto or off of the truck bed, load gear 75 can be driven alone, in either a forward or a reverse direction, to apply a twisting force to the camper body until it is properly aligned.

Upstanding guides 80 are adapted to be secured to supports 35 and 77 by bolts 81 adapted to be inserted through elongate holes 35d and 77d and nuts, not shown. The elongate holes allow the guides to be adjustably positioned so that their upstanding faces will engage the sides of the camper body as it is moved onto or off of the truck bed.

As shown in FIG. 10, the same bracket 66 and supports 35 and 77 can be used in a system wherein only a single, central rack is provided on the bottom of the camper body. In this instance, however, the shaft 76 is shortened and driven gear 73 and load gear 75 are replaced by a roller 83 that is freely journaled on shaft 76. The support 77 is then positioned at the center of the truck bed by bolts 65c (FIG. 8). Bolts 65d are used to secure an additional support 85 to the rear of the truck bed. Support 85 has a roller 86, journaled on an axis extending between walls 85a and 85b. It may also have an adjustment bolt 87, like those previously disclosed, threaded therethrough, for adjusting the position of the roller with respect to the truck bed.

With the drive means herein disclosed, common brackets, supports, gears and shafts can be used for either a double rack or a single rack system and significant economies are realized over the cost of manufacture of units that can be used with only one such rack system.

While the racks 23 have been herein illustrated as comprising perforated straps and the load gears have teeth adapted to mesh with the perforations of the racks, it is to be understood that any meshing or friction means of translating the camper body could be used and that the terms load gears and racks are intended to encompass all such systems and especially those disclosed in the prior art patents heretofore mentioned, and the use of sprockets or gears having spaced apart sets of teeth adapted to straddle an elongate central portion of a rack or track and to mesh with spaced notches formed at opposite sides of the track.

The complete camper loading and retaining system herein disclosed provides a more efficient, convenient, and safer manner of handling camper bodies while reducing the costs incident the manufacture and installation of such systems.

We claim:

1. A composite bumper for a camper body comprising
    a central section;
        outer sections partially overlapping said central section;
        each of the central and outer bumper sections having an inturned flange extending substantially normal to a main body portion, said inturned flanges forming part of the means for individually securing each of said central and outer body portions to a camper body;
        means for selectively interconnecting said central and outer sections to thereby adjust the length of the bumper;
        means for individually securing each of said central and outer sections to a camper body to project therebelow;
    leg support brackets;
    means for securing one of said leg support brackets to each of the outer sections, whereby they form integral portions of the bumper;
    inturned flanges on the leg support brackets; and
    means for securing the inturned flanges of the leg support brackets to the bottom of a camper body.

2. A composite bumper as in claim 1, further including leg members;
    means pivotally connecting one of said leg members to each of said leg support brackets; and
    means for securing each such leg member in a downwardly extending position and at least one raised, stowed position.

3. A composite bumper as in claim 2, wherein the leg members are each extensible legs.

* * * * *